United States Patent [19]
Suzuki et al.

[11] Patent Number: 5,227,918
[45] Date of Patent: Jul. 13, 1993

[54] WIDE FIELD EYEPIECE LENS SYSTEM

[75] Inventors: Toshinobu Suzuki; Takaaki Tanaka, both of Tokyo; Mitsuo Arima, Nagano, all of Japan

[73] Assignee: Olympus Optical Co., Ltd., Tokyo, Japan

[21] Appl. No.: 863,372

[22] Filed: Apr. 3, 1992

Related U.S. Application Data

[63] Continuation of Ser. No. 682,409, Apr. 8, 1991, abandoned, which is a continuation of Ser. No. 433,843, Nov. 9, 1989, abandoned.

[30] Foreign Application Priority Data

Nov. 10, 1988 [JP] Japan ................... 63-282359
Jul. 14, 1989 [JP] Japan ................... 1-180179

[51] Int. Cl.$^5$ ............................. G02B 25/00
[52] U.S. Cl. ..................... 359/644; 359/643
[58] Field of Search ............. 350/410; 359/644, 643

[56] References Cited
U.S. PATENT DOCUMENTS 4,268,128 5/1981 Uetake et al. ............... 350/410

FOREIGN PATENT DOCUMENTS

| 297529 | 10/1927 | Japan . |
| 47-1062 | 1/1972 | Japan . |
| 49-69148 | 7/1974 | Japan . |
| 60-57315 | 4/1985 | Japan . |
| 60-159719 | 8/1985 | Japan . |
| 60-214329 | 10/1985 | Japan . |

Primary Examiner—Bruce Y. Arnold
Assistant Examiner—Hung Xuan Dang
Attorney, Agent, or Firm—Cushman, Darby & Cushman

[57] ABSTRACT

An eyepiece lens system comprising, in the order from the side of incidence of rays, a first lens unit having positive or negative refractive power as a whole and a second lens unit having positive refractive power as a whole, said eyepiece lens system having little aberrations, image surface flatness excellent to the marginal portions of visual field, a high eye point and a wide visual field.

6 Claims, 5 Drawing Sheets

WIDE FIELD EYEPIECE LENS SYSTEM

This is a continuation of application Ser. No. 07/682,409, filed on Apr. 8, 1991, now abandoned which was a continuation of Ser. No. 07/433,834, filed Nov. 9, 1989, now abandoned.

BACKGROUND OF THE INVENTION a) Field of the Invention

The present invention relates to an eyepiece lens system, and more specifically to an eyepiece lens system having a wide visual field and favorably corrected aberrations.

b) Description of the Prior Art

Eyepiece lens systems are a kind of magnifying lenses and generally have simple compositions consisting only of convex lens elements. Most of the eyepiece lens systems of such compositions have Petzval's sums of large positive values, allow curvature of field to remain therein and produce remarkable distortion. For this reason, image surfaces of objective lens systems and those of eyepiece lens systems are inclined in the directions reverse to each other in optical systems for microscopes so as to form flat images with the optical systems as wholes, but such a measure cannot correct the inclinations of the images sufficiently. Further, in order to prevent the image surface from being inclined, there is adopted an auxiliary means for correcting the curvature of field by preventing inclination of an average image surface of the meridional image surface and the sagital image surface. As the conventional eyepiece lens system adopting this auxiliary correcting means, there is known the lens system disclosed by Japanese Unexamined Published Patent Application No. 57315/60. When this correcting means is adopted for a lens system having a large Petzval's sum, however, astigmatism is not corrected sufficiently since the meridional image surface is separated from the sagital image surface. Furthermore, eyepiece lens systems produce more remarkable distortion than objective lens systems in optical systems for microscopes. Accordingly, it is desired to correct distortion favorably in eyepiece lens systems.

Moreover, when an eyepiece lens system has a long eye relief, spherical aberration of pupil cannot be corrected sufficiently, vignetting may be caused at merginal portion of visual field and, in addition, it is difficult to favorably correct aberrations of the rays at the marginal portions of visual field, especially coma, astigmatism and lateral chromatic aberration.

SUMMARY OF THE INVENTION

A primary subject of the present invention is to provide an outside-focus type wide field eyepiece lens system having a high eye point, distortion corrected sufficiently favorably, excellent flatness of image surface and spherical aberration corrected also favorably.

The eyepiece lens system according to the present invention comprises, in the order from the side of incidence of rays, a first lens unit I having positive or negative refractive power and a second lens unit II having positive refractive power as a whole, and is so designed as to satisfy the following conditions (1), (2) and (3):

$$0.8 < |f_1|/f \quad (1)$$

$$0.5 < |f_2 f_2| 1.5 \quad (2)$$

$$d_2 < 0.4f \quad (3)$$

wherein the reference symbol f represents focal length of the eyepiece lens system as a whole, the reference symbol $f_1$ designates focal length of the first lens unit I, the reference symbol $f_2$ denotes focal length of the second lens unit II, and the reference symbol $d_2$ represents an airspace reserved between the first lens unit I and the second lens unit II.

The second lens unit II consists of, in order from the incidence side of light, a first cemented lens component, a second positive lens component and a third cemented lens component. The first cemented lens component and the third cemented lens components each include a plurality of lens elements that are cemented together to form doublets.

The condition (1) is necessary for accomplishing the objects of the present invention or to obtain an eyepiece lens system which has a high eye point, an image surface flat to the marginal portion of visual field and offaxial aberrations favorably corrected. A concave lens element, or a positive or negative lens element having a long focal length which is called as the field flattener is used for correcting Petzval's sum. If the lower limit of the condition (1) is exceeded, the offaxial aberrations, mainly coma and astigmatism, will be aggravated and can hardly be corrected with convex lens elements.

The condition (2) is required for correcting the offaxial aberrations for the rays incident on the first lens unit I while maintaining a small Petzval's sum. If the upper limit of the condition (2) is exceeded, it will be impossible to sufficiently correct the offaxial aberrations, especially coma and astigmatism. If the lower limit of the condition (2) is exceeded, Petzval's sum will be enlarged, thereby making it impossible to maintain flatness of the image surface.

The condition (3) is adopted for favorably correcting the offaxial aberrations while maintaining a small Petzval's sum. If the upper limit of the condition (3) is exceeded, it will be difficult to correct the offaxial aberrations. Speaking more concretely, the offaxial aberrations produced in the first lens unit I are remarkably aggravated when the rays are incident on the second lens unit II and cannot be corrected by the second lens unit.

In order to correct the offaxial aberrations more favorably while maintaining a small Petzval's sum in the eyepiece lens system according to the present invention, it is desirable to design the lens system so as to satisfy the following additional conditions (4) and (5):

$$D > 0.5f \quad (4)$$

$$|r_3| > 0.5f \quad (5)$$

wherein the reference symbol D represents distance as measured from the extremely object side surface of the second lens unit II to the extremely image side surface of said lens unit, and the reference symbol $r_3$ designates radius of curvature on the extremely object side surface of the second lens unit.

If the lower limit of the condition (4) is exceeded, the offaxial aberrations, especially astigmstism, produced in the first lens unit I cannot be corrected sufficiently by the second lens unit II.

If the lower limit of the condition (5) is exceeded, it will be very difficult to correct coma in the second lens unit II and, in addition, distortion will be corrected insufficiently due to aggravation of the aberration of pupil.

DETAILED DESCRIPTION OF THE PREFERRED EMBODIMENTS

Figure 1:
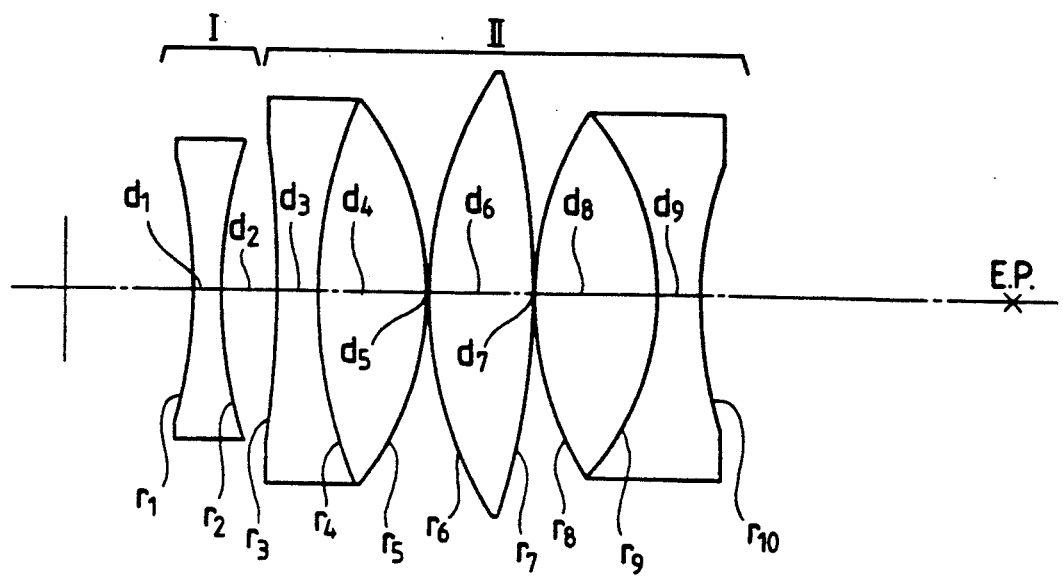
FIG. 1 through FIG. 5 show sectional views illustrating compositions of Embodiments 1 through 5 of the eyepiece lens system according to the present invention.
Figure 2:
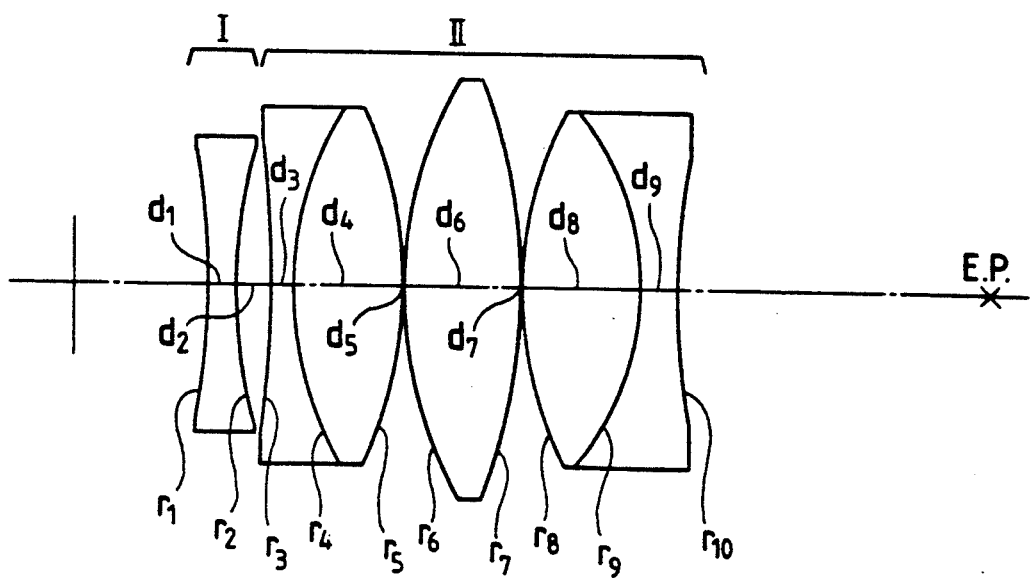
Figure 3:
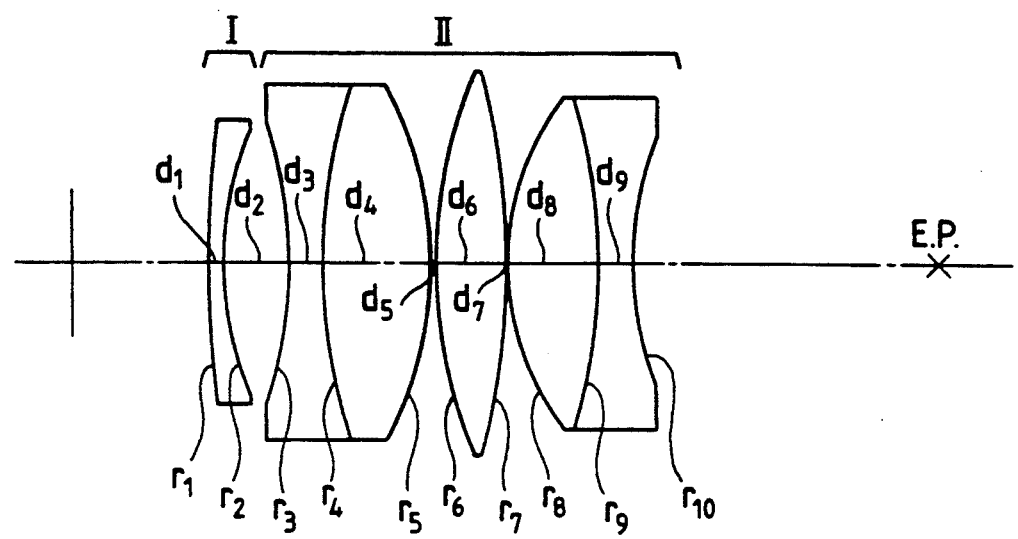
Figure 4:
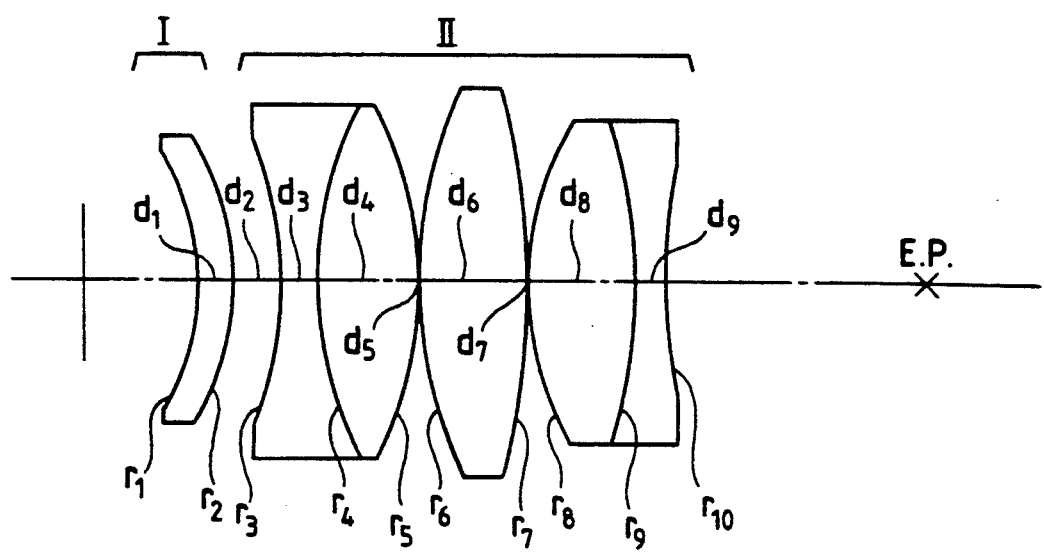
Figure 5:
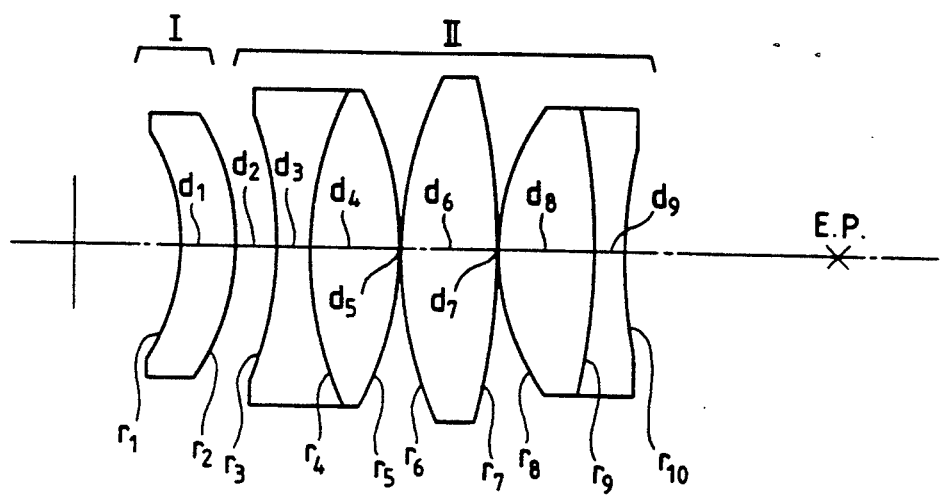

Now, the present invention will be described more detailedly with reference to the preferred Embodiments illustrated in the accompanying drawings and given in the form of the following numerical data:

Embodiment 1
$f = 1$
eye relief 0.9354, Petzval's sum 0.196

$r_1 = -1.5061$
$\quad d_1 = 0.0800 \quad n_1 = 1.60342 \quad v_1 = 38.01$
$r_2 = 1.8615$
$\quad d_2 = 0.1754$
$r_3 = -2.9414$
$\quad d_3 = 0.1202 \quad n_2 = 1.75520 \quad v_2 = 27.51$
$r_4 = 1.4799$
$\quad d_4 = 0.3304 \quad n_3 = 1.60311 \quad v_3 = 60.70$
$r_5 = -1.0382$
$\quad d_5 = 0.0120$
$r_6 = 1.2453$
$\quad d_6 = 0.3320 \quad n_4 = 1.69350 \quad v_4 = 50.81$
$r_7 = -2.4484$
$\quad d_7 = 0.0120$
$r_8 = 1.0943$
$\quad d_8 = 0.3600 \quad n_5 = 1.60311 \quad v_5 = 60.70$
$r_9 = -0.9415$
$\quad d_9 = 0.1275 \quad n_6 = 1.74950 \quad v_6 = 35.27$
$r_{10} = 1.3548$ $f_1 = -1.37f, \quad f_2 = 0.758f, \quad d_2 = 0.1754f$
$D = 1.2941f, \quad -r_3 = 2.9414f$

Embodiment 2
$f = 1$
eye relief 0.9333, Petzval's sum 0.363

$r_1 = -2.3337$
$\quad d_1 = 0.0920 \quad n_1 = 1.60342 \quad v_1 = 38.01$
$r_2 = 1.7906$
$\quad d_2 = 0.1000$
$r_3 = -3.5406$
$\quad d_3 = 0.0732 \quad n_2 = 1.75520 \quad v_2 = 27.51$
$r_4 = 1.1004$
$\quad d_4 = 0.3327 \quad n_3 = 1.56873 \quad v_3 = 63.16$
$r_5 = -1.2958$
$\quad d_5 = 0.0114$
$r_6 = 1.3526$
$\quad d_6 = 0.3600 \quad n_4 = 1.69680 \quad v_4 = 56.49$
$r_7 = -1.8045$
$\quad d_7 = 0.0093$
$r_8 = 1.1799$
$\quad d_8 = 0.3680 \quad n_5 = 1.60311 \quad v_5 = 60.70$
$r_9 = -0.8400$
$\quad d_9 = 0.1082 \quad n_6 = 1.74400 \quad v_6 = 44.73$
$r_{10} = 2.7999$ $f_1 = -1.67f, \quad f_2 = 0.789f, \quad d_2 = 0.1f$
$D = 1.2628f, \quad -r_3 = 3.5406f$

Embodiment 3
$f = 1$
eye relief 0.9194, Petzval's sum 0.318

$r_1 = 3.1183$
$\quad d_1 = 0.0472 \quad n_1 = 1.57309 \quad v_1 = 42.57$
$r_2 = 1.1089$
$\quad d_2 = 0.1934$
$r_3 = -1.7526$
$\quad d_3 = 0.1149 \quad n_2 = 1.75520 \quad v_2 = 27.51$
$r_4 = 3.0777$
$\quad d_4 = 0.3316 \quad n_3 = 1.60311 \quad v_3 = 60.70$
$r_5 = -1.1674$
$\quad d_5 = 0.0114$
$r_6 = 1.6134$
$\quad d_6 = 0.2178 \quad n_4 = 1.69350 \quad v_4 = 50.81$
$r_7 = -2.6300$
$\quad d_7 = 0.0093$
$r_8 = 0.8182$
$\quad d_8 = 0.2938 \quad n_5 = 1.62041 \quad v_5 = 60.27$
$r_9 = -2.1155$
$\quad d_9 = 0.0910 \quad n_6 = 1.75520 \quad v_6 = 27.51$
$r_{10} = 1.1201$ $f_1 = -3.03f, \quad f_2 = 0.861f, \quad d_2 = 0.1934f$
$D = 1.0698f, \quad -r_3 = 1.7526f$

Embodiment 4
$f = 1$
eye relief 0.852, Petzval's sum 0.421

$r_1 = -0.8247$
$\quad d_1 = 0.112 \quad n_1 = 1.85026 \quad v_1 = 32.28$
$r_2 = -0.88$
$\quad d_2 = 0.152$
$r_3 = -1.3274$
$\quad d_3 = 0.1272 \quad n_2 = 1.834 \quad v_2 = 37.16$
$r_4 = 1.1862$
$\quad d_4 = 0.336 \quad n_3 = 1.60311 \quad v_3 = 60.7$
$r_5 = -1.2249$
$\quad d_5 = 0.008$
$r_6 = 1.5098$
$\quad d_6 = 0.352 \quad n_4 = 1.8044 \quad v_4 = 39.58$
$r_7 = -2.4903$
$\quad d_7 = 0.008$
$r_8 = 0.9711$
$\quad d_8 = 0.36 \quad n_5 = 1.48749 \quad v_5 = 70.2$
$r_9 = -1.6913$
$\quad d_9 = 0.112 \quad n_6 = 1.84666 \quad v_6 = 23.78$
$r_{10} = 2.5876$ $f_1 = -221.34f, \quad f_2 = 1.06f, \quad d_2 = 0.152f$
$D = 1.3032f, \quad -r_3 = 1.3274f$

Embodiment 5
$f = 1$
eye relief 0.852, Petzval's sum 0.36

$r_1 = -0.8075$
$\quad d_1 = 0.2 \quad n_1 = 1.85026 \quad v_1 = 32.28$
$r_2 = -0.88$
$\quad d_2 = 0.152$
$r_3 = -1.3876$
$\quad d_3 = 0.1272 \quad n_2 = 1.834 \quad v_2 = 37.16$
$r_4 = 1.3096$
$\quad d_4 = 0.336 \quad n_3 = 1.60311 \quad v_3 = 60.7$
$r_5 = -1.2455$
$\quad d_5 = 0.008$
$r_6 = 1.5273$
$\quad d_6 = 0.352 \quad n_4 = 1.8044 \quad v_4 = 39.58$
$r_7 = -3.1442$
$\quad d_7 = 0.008$
$r_8 = 0.8671$
$\quad d_8 = 0.36 \quad n_5 = 1.48749 \quad v_5 = 70.2$
$r_9 = -2.5558$
$\quad d_9 = 0.112 \quad n_6 = 1.84666 \quad v_6 = 23.78$
$r_{10} = 1.7098$ $f_1 = 42.973f, \quad f_2 = 1.129f, \quad d_2 = 0.152f$ -continued Embodiment 5
f = 1
eye relief 0.852, Petzval's sum 0.36

D = 1.3032f,   $-r_3$ = 1.3876f wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_9$ denote refractive indices of the respective lens elements, and the reference symbols $v_1$ through $v_9$ represent Abbe's numbers of the respective lens elements.

Out of the Embodiments described above, each of the Embodiments 1, 2 and 3 comprises a concave surface on the image side of the first lens unit I and a concave surface on the object side of the second lens unit II which are opposed to each other.

Figure 6:
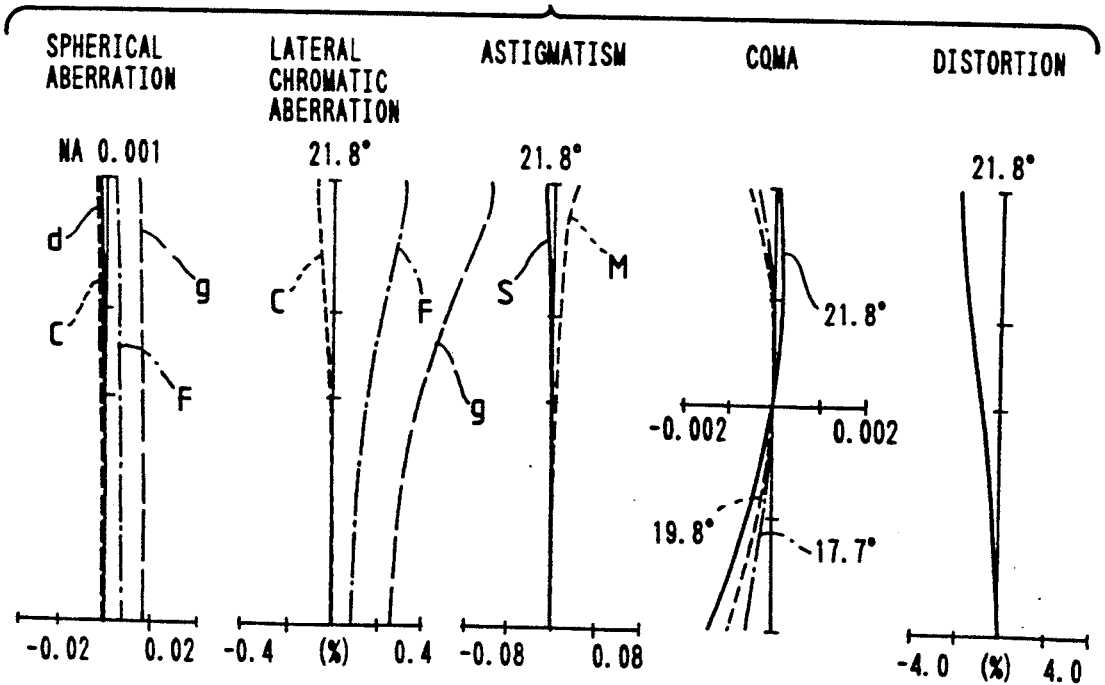
FIG. 6 through FIG. 10 show graphs illustrating aberration characteristics of the Embodiments 1 through 5 respectively of the present invention.
Figure 7:
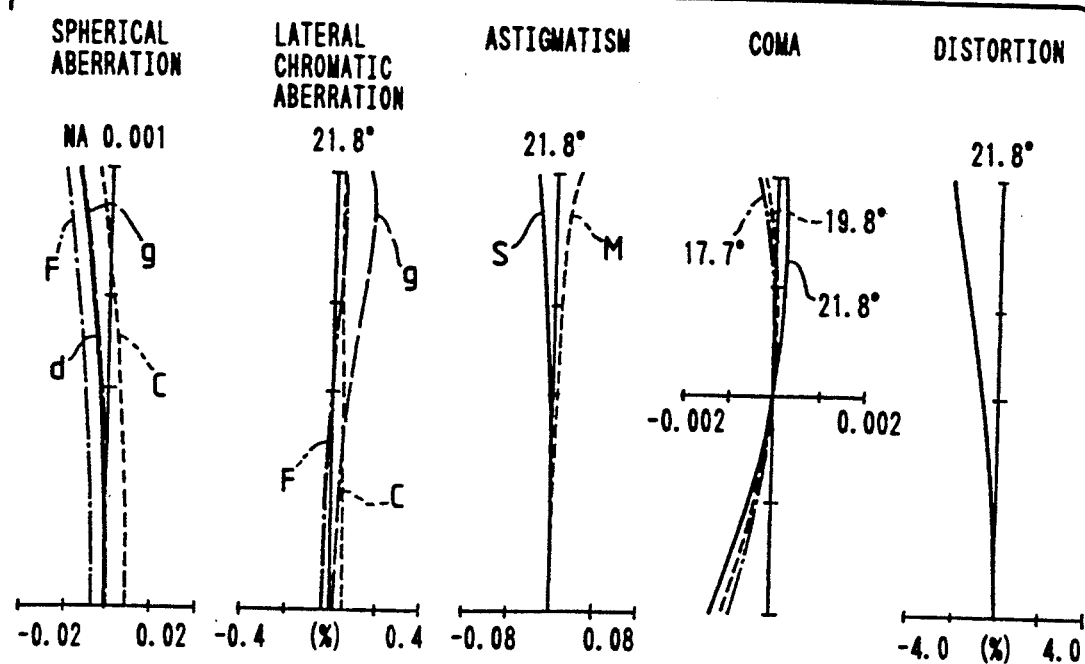
Figure 8:
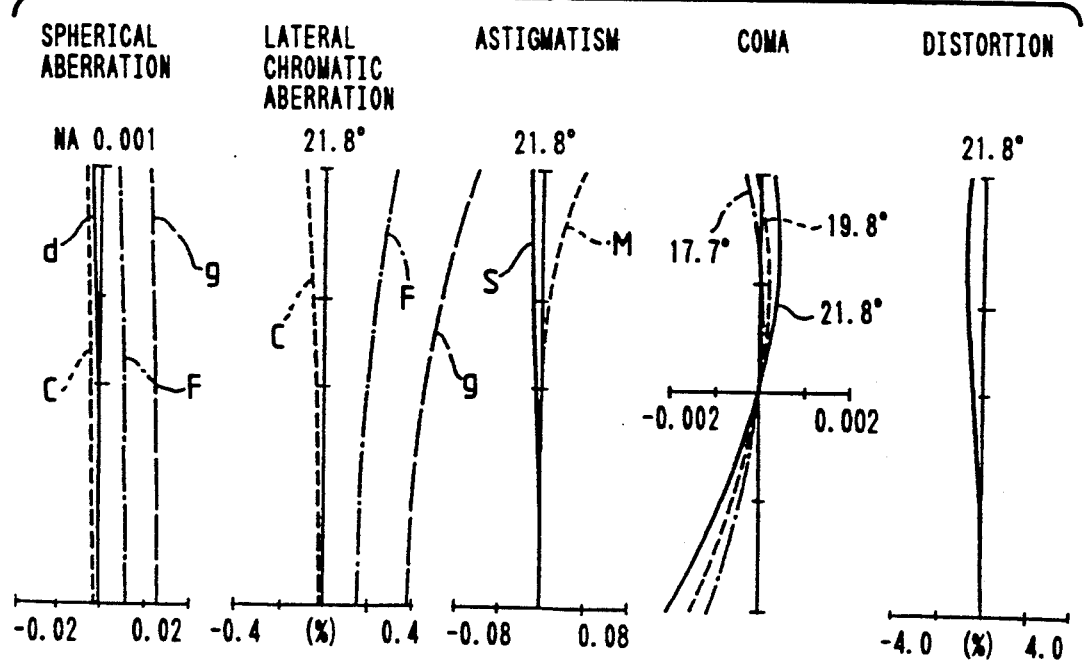
Figure 9:
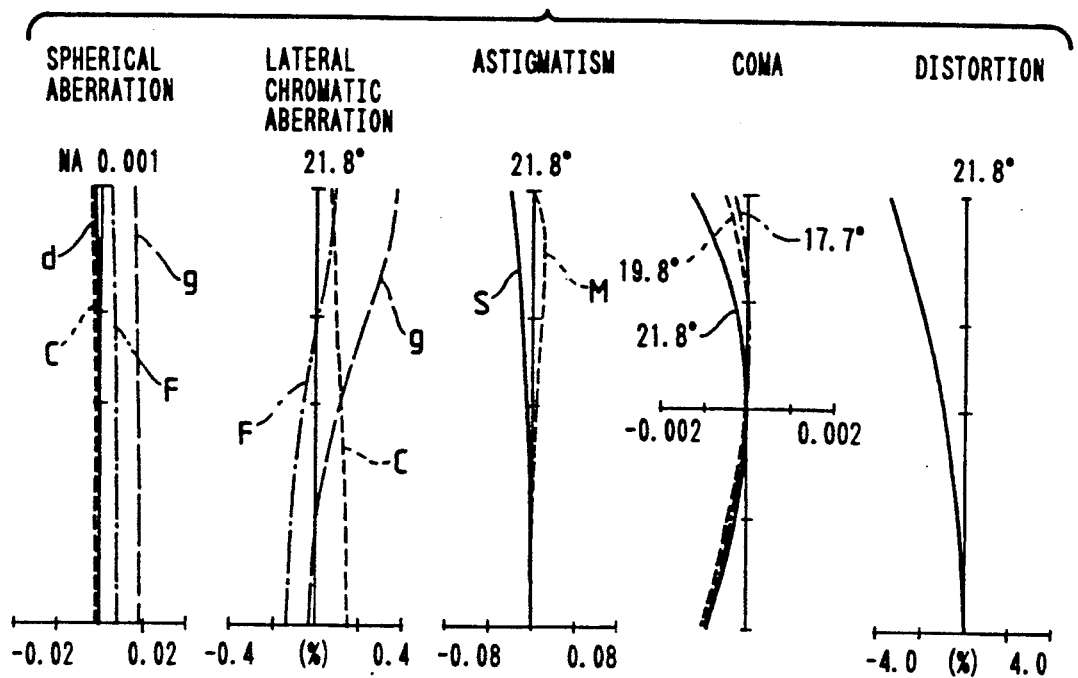
Figure 10:
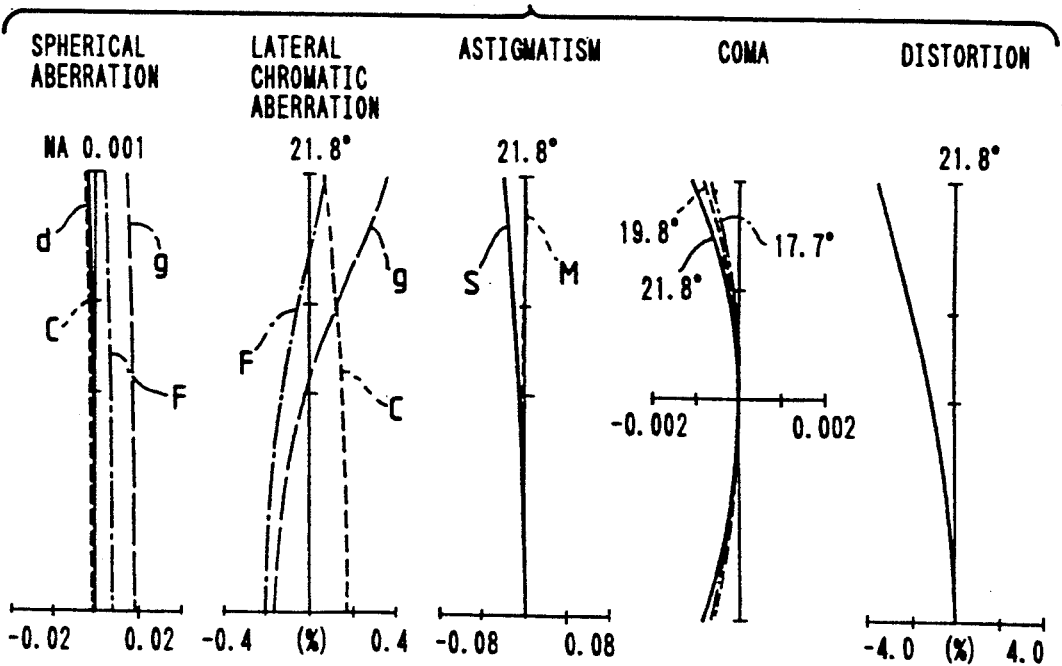

The aberration characteristic curves of the Embodiments 1 through 5 illustrated in FIG. 6 through FIG. 10 were obtained by tracing rays incident from the side of the eye.

The eyepiece lens system according to the present invention has a high eye point, a wide visual field, little aberrations, and can form images having excellent image surface flatness even to the marginal portions of the visual field. In other words, the eyepiece lens system according to the present invention has an eye relief of a value close to the focal length of the lens system, a Petzval's sum which is smaller than that of the lens system having excellent image surface flatness out of the conventional eyepiece lens systems having high eye points, and an image surface flatness which is corrected exceptionally favorably.

We claim:

1. A wide field eyepiece lens system, comprising, in order from the incidence side of light:
   a first lens unit having a positive refractive power; and
   a second lens unit having a positive refractive power;
   wherein said second lens unit consists of, in order from the incidence side of light, a first cemented lens component, a second positive lens component and a third cemented lens component, with each of said first and third cemented lens components comprising a plurality of lens elements cemented together to form doublets; and
   wherein said eyepiece lens system satisfies the following conditions (1) through (3):

$0.8 < |f_1|/f$  (1)

$0.5 < f_2/f < 1.5$  (2)

$d_2 < 0.4f$  (3)

wherein the reference symbol f represents the focal length of the eyepiece lens system as a whole, the reference symbol $f_1$ designates the focal length of said first lens unit, the reference symbol $f_2$ denotes the focal length of said second lens unit, and the reference symbol $d_2$ denotes an airspace interposed between said first lens unit and said second lens unit.

2. A wide field eyepiece lens system, comprising, in order from the incidence side of light:
   a first lens unit having a negative refractive power; and
   a second lens unit having a positive refractive power;
   wherein said second lens unit consists of, in order from the incidence side of light, a first cemented lens component, a second positive lens component and a third cemented lens component, with each of said first and third cemented lens components comprising a plurality of lens elements cemented together to from doublets; and
   wherein said eyepiece lens system satisfies the following conditions (1) through (3):

$0.8 < |f_1|/f$  (1)

$0.5 < f_2/f < 1.5$  (2)

$d_2 < 0.4f$  (3)

wherein the reference symbol f represents the focal length of the eyepiece lens system as a whole, the reference symbol $f_1$ designates the focal length of said first lens unit, the reference symbol $f_2$ denotes the focal length of said second lens unit, and the reference symbol $d_2$ an airspace interposed between said first lens unit and said second lens unit.

3. An eyepiece lens system according to claim 1 or 2 wherein said first lens unit consists of a single lens component.

4. A wide field eyepiece lens system according to claim 1 or 2 wherein both said first lens component and said third lens component have a positive refractive power.

5. An eyepiece lens system according to claim 1 or 2 wherein both said first lens component and said third lens component have a concave surface on its respective emergence side.

6. A wide field eyepiece lens system according to claim 1 or 2, satisfying the following conditions (4) or (5):

$D > 0.5f$ $|r_3| > 0.5f$ wherein the reference symbol D represents distance as measured from an extreme object side surface of said second lens unit to an extreme image side surface of said second lens unit and the reference symbol $r_3$ designates a radius of curvature on the extreme object side surface of said second lens unit.

* * * * *